US010649226B2

United States Patent
Minamisawa et al.

(10) Patent No.: US 10,649,226 B2
(45) Date of Patent: May 12, 2020

(54) OPTICAL UNIT WITH SHAKE CORRECTION FUNCTION

(71) Applicant: NIDEC SANKYO CORPORATION, Suwa-gun, Nagano (JP)

(72) Inventors: Shinji Minamisawa, Nagano (JP); Takeshi Sue, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 68 days.

(21) Appl. No.: 15/809,104

(22) Filed: Nov. 10, 2017

(65) Prior Publication Data

US 2018/0129065 A1 May 10, 2018

(30) Foreign Application Priority Data

Nov. 10, 2016 (JP) ................... 2016-219849

(51) Int. Cl.
  *G02B 27/64* (2006.01)
  *G03B 29/00* (2006.01)
  *G02B 7/08* (2006.01)
  *G02B 7/04* (2006.01)
  *G03B 5/06* (2006.01)

(52) U.S. Cl.
  CPC ............ *G02B 27/646* (2013.01); *G02B 7/04* (2013.01); *G02B 7/08* (2013.01); *G03B 5/06* (2013.01); *G03B 29/00* (2013.01); *G03B 2205/0007* (2013.01); *G03B 2205/0015* (2013.01); *G03B 2205/0069* (2013.01)

(58) Field of Classification Search
  CPC ......... G02B 27/646; G02B 7/04; G02B 7/08; G02B 27/64; G03B 29/00; G03B 5/06; G03B 2205/0007; G03B 2205/0015; G03B 2205/0069
  See application file for complete search history.

(56) References Cited

U.S. PATENT DOCUMENTS

2001/0010557 A1* 8/2001 Iiizumi .................. G02B 7/04
  348/345
2013/0194490 A1* 8/2013 Okuyama ............... G02B 7/08
  348/374

FOREIGN PATENT DOCUMENTS

JP    2015082072 A    4/2015

OTHER PUBLICATIONS

Examiner provided machine translation of Yoshihiro et al. (JP 2015082072 A) (Year: 2015).*

* cited by examiner

*Primary Examiner* — William R Alexander
*Assistant Examiner* — Balram T Parbadia
(74) *Attorney, Agent, or Firm* — Cantor Colburn LLP

(57) ABSTRACT

An optical unit with a shake correction function may include an optical module comprising an optical element; a swing support mechanism structured to swingably support the optical module between a reference posture in which a preset axis and an optical axis are aligned, and an inclined posture in which the optical axis is inclined with respect to the axis; a holder structured to support the optical module via the swing support mechanism; a rotation support mechanism structured to rotatably support the holder around the axis; a fixed body structured to support the holder via the rotation support mechanism; a swing magnetic drive mechanism structured to swing the optical module; and a rolling magnetic drive mechanism structured to rotate the holder. The rotation support mechanism may include a rotation bearing that supports the holder on a subject side of the swing support mechanism.

12 Claims, 12 Drawing Sheets

OPTICAL UNIT WITH SHAKE CORRECTION FUNCTION

CROSS REFERENCE TO RELATED APPLICATIONS

The present invention claims priority under 35 U.S.C. § 119 to Japanese Application No. 2016-219849 filed Nov. 10, 2016, the entire content of which is incorporated herein by reference.

BACKGROUND

1. Field of the Invention

At least an embodiment of the present invention relates to an optical unit with a shake correction function installed in a mobile terminal or a mobile object.

2. Description of the Related Art

An imaging device installed in a mobile object such as a mobile terminal, a vehicle, or an unmanned helicopter is provided with an optical unit equipped with an optical module for imaging. With this type of optical unit, there is a need to suppress blurring of a captured image due to shaking of the imaging device. Therefore, Patent Literature (JP 2015-82072A) proposes an optical unit with a shake correction function, which is provided with a swing drive mechanism that swings an optical module in a yawing (lateral shake: panning) direction and a pitching (vertical shake: tilting) direction that intersects an optical axis, and a rolling magnetic drive mechanism that rotates the optical module around the optical axis.

The optical unit with a shake correction function described in the Patent Literature (JP 2015-82072A) includes an optical module that retains an optical element, a swing support mechanism that swingably supports the optical module, a holder that supports the optical module via the swing support mechanism, a rotation support mechanism that rotatably supports the holder, and a fixed body that supports the holder via the rotation support mechanism. The rotation support mechanism includes a ball bearing. The ball bearing supports the holder on the image side of the swing support mechanism in the optical axis direction.

When the rotation support mechanism that rotatably supports the holder is positioned to the image side of the swing support mechanism, extreme stress may be generated in the rotation support mechanism if the optical unit with a shake correction function is impacted from the outside, and as a result, they may be easily damaged. For example, with the optical module, if a large aperture lens or a glass lens is provided as the optical element, the center of gravity of the holder that supports the optical module via the swing support mechanism will be offset to the side with the subject. In such a case, if the rotation support mechanism is positioned to the image side of the swing support mechanism, the distance between the center of gravity of the holder and the optical module, and the rotation support mechanism, would be greater, so if external force were applied, stress would likely be generated in the rotation support mechanism, so there is a possibility of damaging the rotation support mechanism.

SUMMARY

In view of the foregoing problem, at least an embodiment of the present invention provides an optical unit with a shake correction function capable of preventing or suppressing damage to a rotation support mechanism even if external force is applied.

To solve the problem described above, the optical unit with a shake correction function of at least an embodiment of the present invention is provided with an optical module that retains an optical element, a swing support mechanism that swingably supports the optical module between a reference posture in which a preset axis and an optical axis are aligned, and an inclined posture in which the optical axis is inclined with respect to the axis, a holder that supports the optical module via the swing support mechanism, a rotation support mechanism that rotatably supports the holder around the axis, a fixed body that supports the holder via the rotation support mechanism, a swing magnetic drive mechanism that swings the optical module, and a rolling magnetic drive mechanism that rotates the holder. The rotation support mechanism includes a rotation bearing that supports the holder on a subject side of the swing support mechanism.

In at least an embodiment of the present invention, the rotation bearing of the rotation support mechanism that rotatably supports the holder is positioned to the subject side of the swing support mechanism. Therefore, for example, even if the center of gravity of the holder that supports the optical module is offset to the subject side due to the optical module having a large aperture lens or a glass lens as the optical element, the distance between the center of gravity of the holder and the rotation support mechanism will be relatively shorter than it would be in a case where the rotation support mechanism is provided to the image side of the swing support mechanism. Therefore, when external force is applied, stress generated in the rotation support mechanism can be suppressed, so damage to the rotation support mechanism and damage to the portion supported by the rotation support mechanism can be prevented or suppressed.

In at least an embodiment of the present invention, in order to rotate the holder around the axis, the rolling magnetic drive mechanism may include a rolling drive magnet arranged on one of the optical module and the fixed body, and a rolling drive coil arranged on the other so as to face the rolling drive magnet.

In at least an embodiment of the present invention, the swing magnetic drive mechanism may include a first swing magnetic drive mechanism and a second swing magnetic drive mechanism for swinging the optical module. Also, when two directions that are orthogonal to the axis and intersect each other are a first direction and a second direction, the swing support mechanism may swingably support the optical module around a first axis along the first direction and around a second axis along the second direction, the rolling drive magnet and the rolling drive coil may face each other in at least one of the first direction and the second direction, and the rolling magnetic drive mechanism may be arranged between the first swing magnetic drive mechanism and the second swing magnetic drive mechanism around the axis. In this way, the rolling magnetic drive mechanism is able to be arranged in an empty space between the first swing magnetic drive mechanism and the second swing magnetic drive mechanism around the axis. Also, the first swing magnetic drive mechanism, the second swing magnetic drive mechanism, and the rolling magnetic drive mechanism are all able to be arranged at the same position in the axial direction, thus making it easy to shorten the device in the axial direction.

In at least an embodiment of the present invention, the first swing magnetic drive mechanism may include a first swing drive coil fixed to the optical module, and a first swing drive magnet fixed to the fixed body, and the second swing magnetic drive mechanism may include a second swing drive coil fixed to the optical module, and a second swing drive magnet fixed to the fixed body. The rolling drive coil may be fixed to the optical module, and the rolling drive magnet may be fixed to the fixed body. The first swing drive coil, the second swing drive coil, and the rolling drive coil may be arranged in the circumferential direction around the optical axis. In this way, the first swing drive coil, the second swing drive coil, and the rolling drive coil are all arranged on the optical module, which makes it easier to integrate a power supplying flexible printed circuit board for supplying power to the drive coils, and the like. Also, the first swing drive coil, the second swing drive coil, and the rolling drive coil can be configured on the flexible printed circuit board, and fixed as one piece to the optical module.

In at least an embodiment of the present invention, the optical module may include a lens tube for retaining the optical element, and the swing support mechanism may include a frame that surrounds the lens tube around the axis, an optical module side support portion that swingably supports the frame on the optical module side, and a holder side support portion that swingably supports the frame on the holder side. The optical module side support portion and the holder side support portion may be positioned between the first swing magnetic drive mechanism and the second swing magnetic drive mechanism around the axis. In this way, the optical module side support portion and the holder side support portion are able to be arranged effectively utilizing the space between the first swing magnetic drive mechanism and the second swing magnetic drive mechanism around the axis.

In at least an embodiment of the present invention, the lens tube may be inserted on an inner peripheral side of the rotation bearing. In this way, it is easy to arrange the center of gravity of the holder that supports the optical module, and the rotation bearing that rotatably supports the holder, in positions close to each other. Also, the lens tube of the optical module can be protected from the outer peripheral side by the rotation bearing.

In at least an embodiment of the present invention, the rolling magnetic drive mechanism may include a magnetic sensor mounted to one of the optical module and the fixed body, whichever the rolling drive coil is fixed to, and the rolling drive magnet may be polarized and magnetized in the circumferential direction around the axis. The magnetic sensor may face a magnetic polarization line of the rolling drive magnet when the optical module is arranged at a preset position of origin around the axis. In this way, the position of origin of a movable body that retains the optical module can be ascertained on the basis of output from the magnetic sensor. Also, shake correction around the rotational axis can be performed by controlling the supply of power to the rolling drive coil on the basis of the output from the magnetic sensor.

In at least an embodiment of the present invention, the magnetic sensor may be in a position overlapping with the frame when the optical module in the reference posture is viewed from a direction orthogonal to the axis. In this way, displacement of the magnetic sensor when the optical module swings can be reduced. Consequently, it is possible to prevent the output from the magnetic sensor from fluctuating greatly due to displacement of the magnetic sensor caused by the swinging of the optical module. Also, when the optical module swings from the reference position to one side and the other side, it is possible to balance the amount of displacement of the magnetic sensor when the optical module has swung to one side with the amount of displacement of the magnetic sensor when the optical module has swung to the other side. As a result, it is possible to balance the outputs from the magnetic sensor when the optical module moves to one side and the other side. Therefore, the position of origin in the swing direction of the holder can be accurately detected.

At least an embodiment of the present invention may have a rotation angle restricting mechanism that defines a rotation angle range of the holder, and the rotation angle restricting mechanism may include a protruding portion that protrudes in a direction intersecting the optical axis, from one to the other of the holder and the fixed body, and a rotation angle restricting portion capable of abutting against the protruding portion from the circumferential direction around the optical axis, in the other of the holder and the fixed body. In this way, it is possible to prevent the optical module (the holder) from rotating excessively.

In at least an embodiment of the present invention, the holder may include a cylindrical portion into which the optical module is inserted, the rotation bearing may be a ball bearing, an inner race of the ball bearing may be fixed to the cylindrical portion of the holder, and an outer race of the ball bearing may be fixed to the fixed body. In this way, the holder that retains the optical module can be rotatably supported by the ball bearing.

According to the optical unit with a shake correction function of at least an embodiment of the present invention, the rotation bearing of the rotation support mechanism that rotatably supports the holder is positioned to the subject side of the swing support mechanism. As a result, the center of gravity of the holder that supports the optical module and the rotation support mechanism are able to be closer together, so even if external force is applied, damage to the rotation support mechanism is able be prevented or suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, embodiments of an optical unit with a shake correction function to which at least an embodiment of the present invention has been applied will be described with reference to the drawings.

(Overall Configuration)

In the present specification, three axes, i.e., XYZ, are in directions orthogonal to each other, with one side in the X axis direction being indicated by +X and the other side being indicated by −X, one side in the Y axis direction being indicated by +Y and the other side being indicated by −Y, and one side in the Z axis direction being indicated by +Z and the other side being indicated by −Z. The Z axis (axis) direction is a direction along an optical axis L of an optical module 4 installed in a movable body 10 of an optical unit with a shake correction function 1, in a state in which the movable body 10 is not swinging. Also, the −Z direction is an image side in the optical axis L direction, and the +Z direction is an object side (subject side) in the optical axis L direction.

Figure 1A:
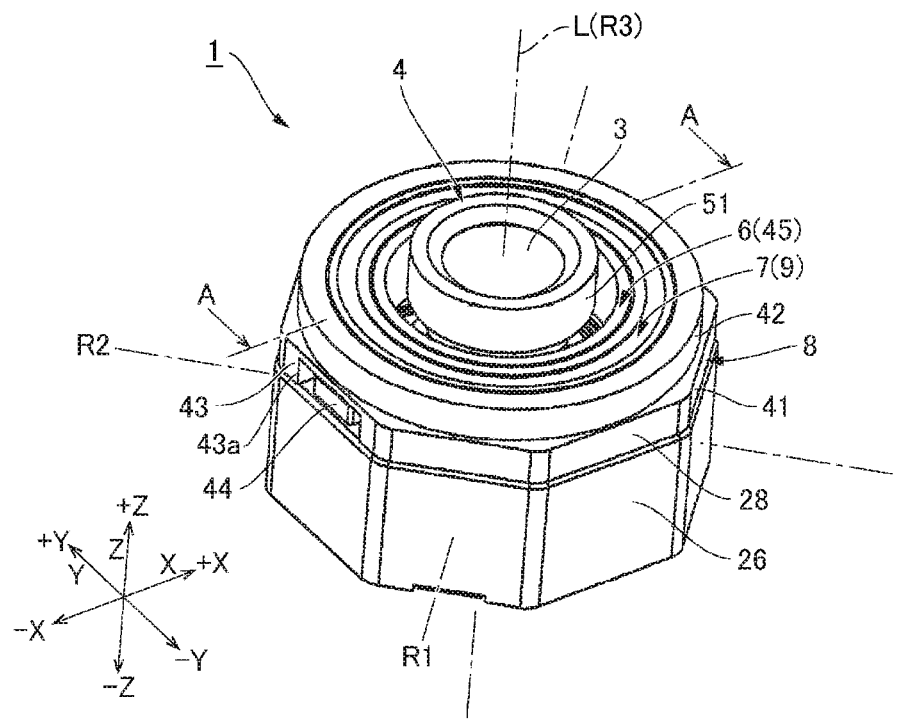
FIGS. 1A and 1B are perspective views of an optical unit with a shake correction function to which at least an embodiment of the present invention has been applied, viewed from an object side and an image side.
Figure 1B:
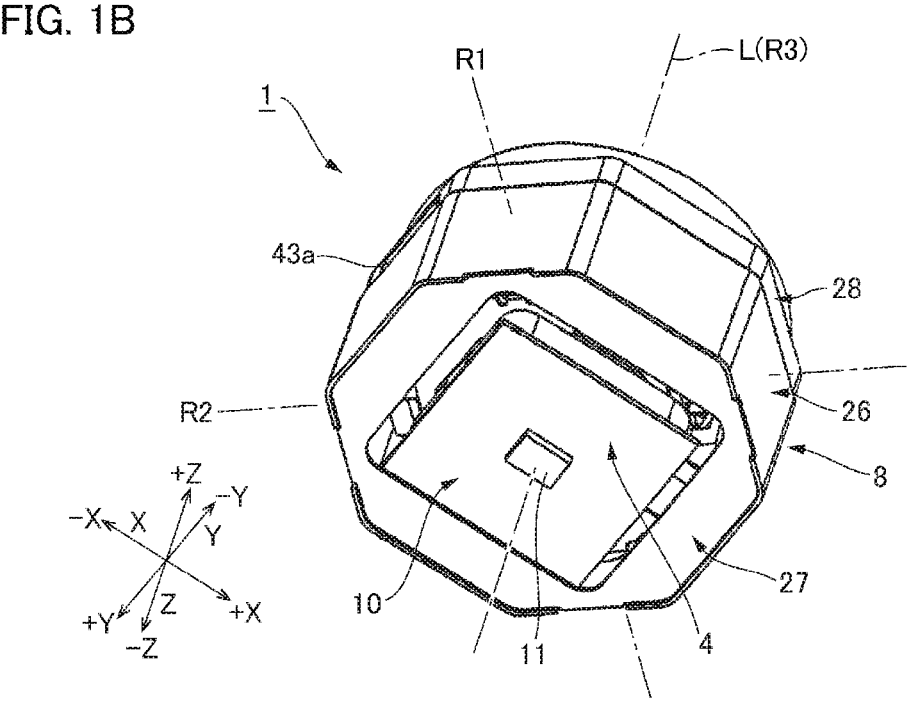
Figure 2:
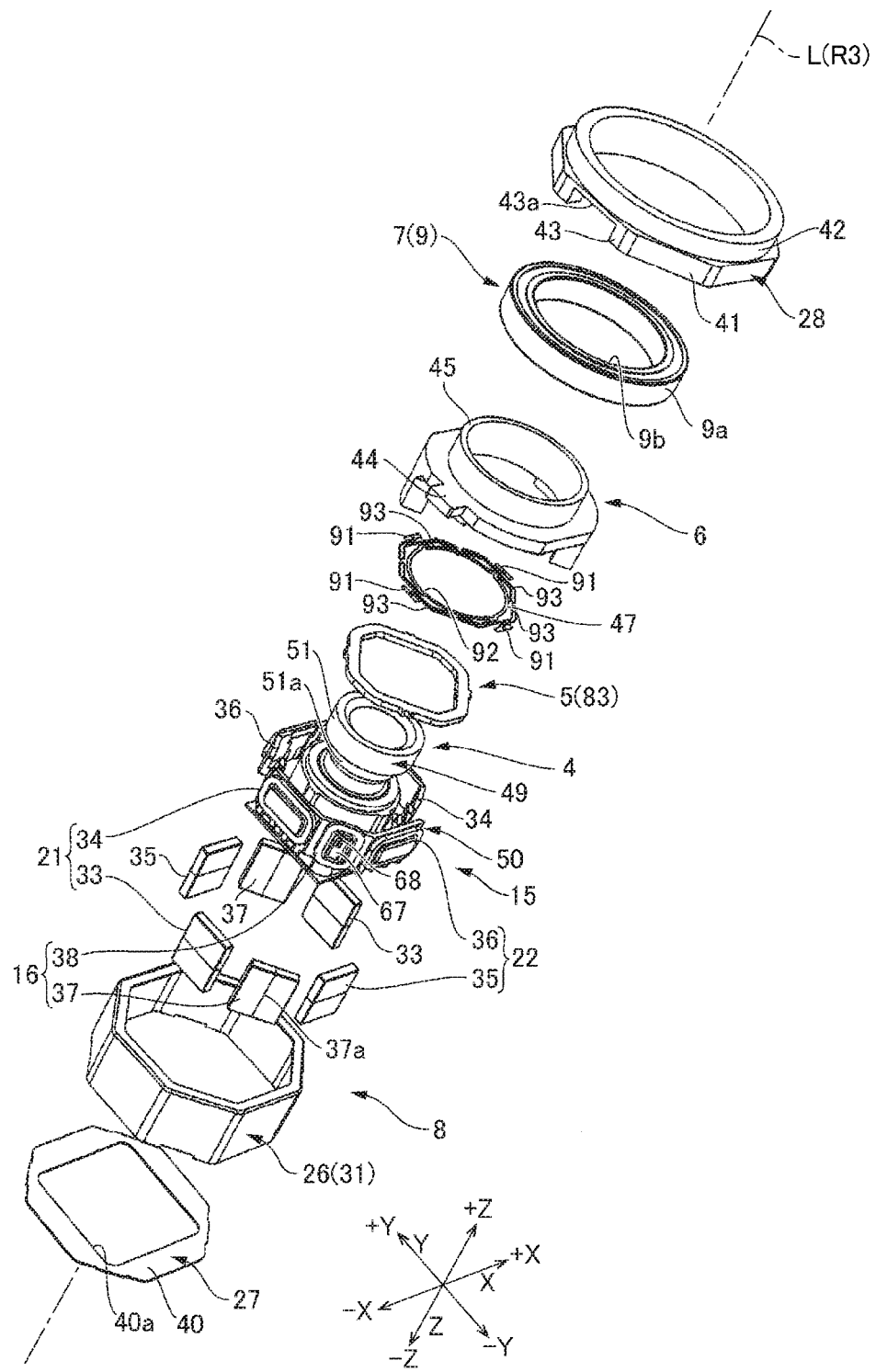
FIG. 2 is an exploded perspective view of the optical unit with a shake correction function in FIG. 1, viewed from the object side.
Figure 3:
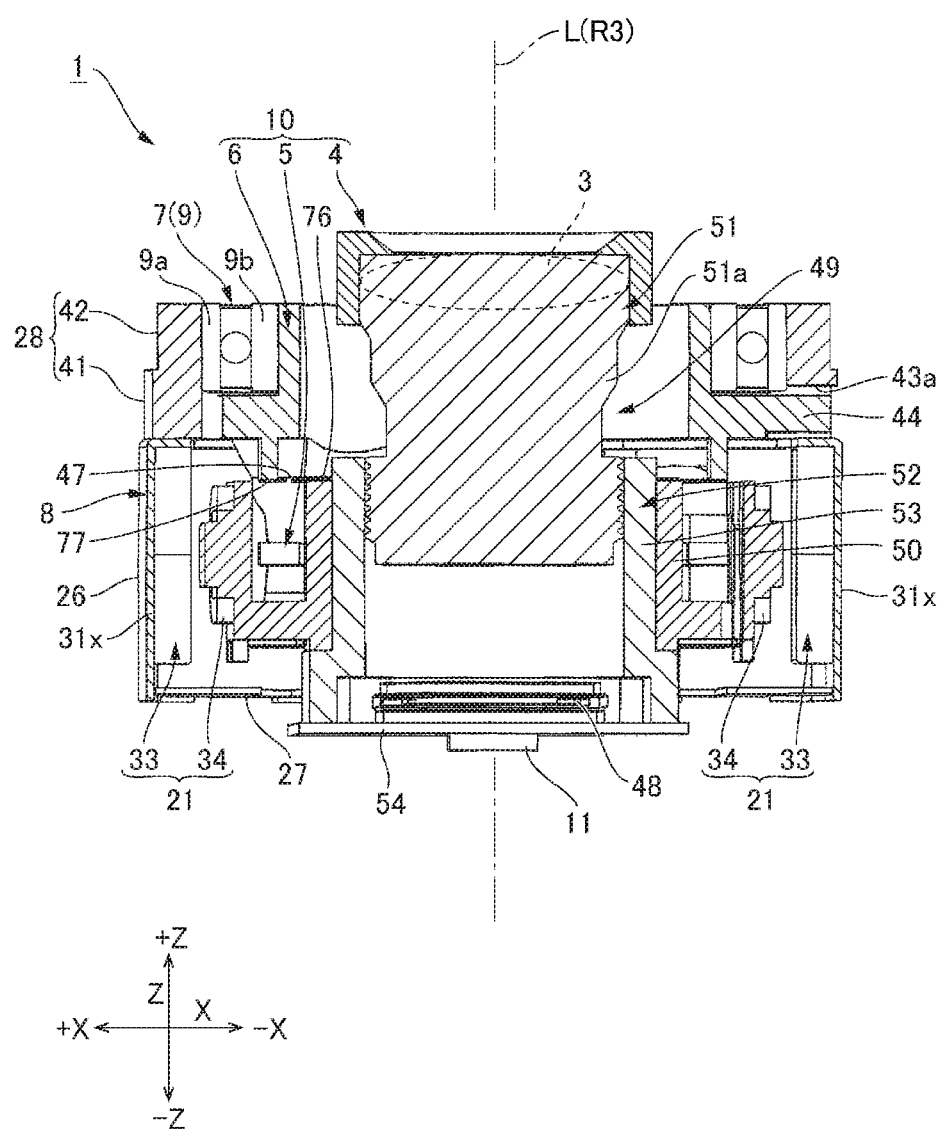
FIG. 3 is a sectional view of the optical unit with a shake correction function taken along line A-A in FIG. 1.
Figure 4A:
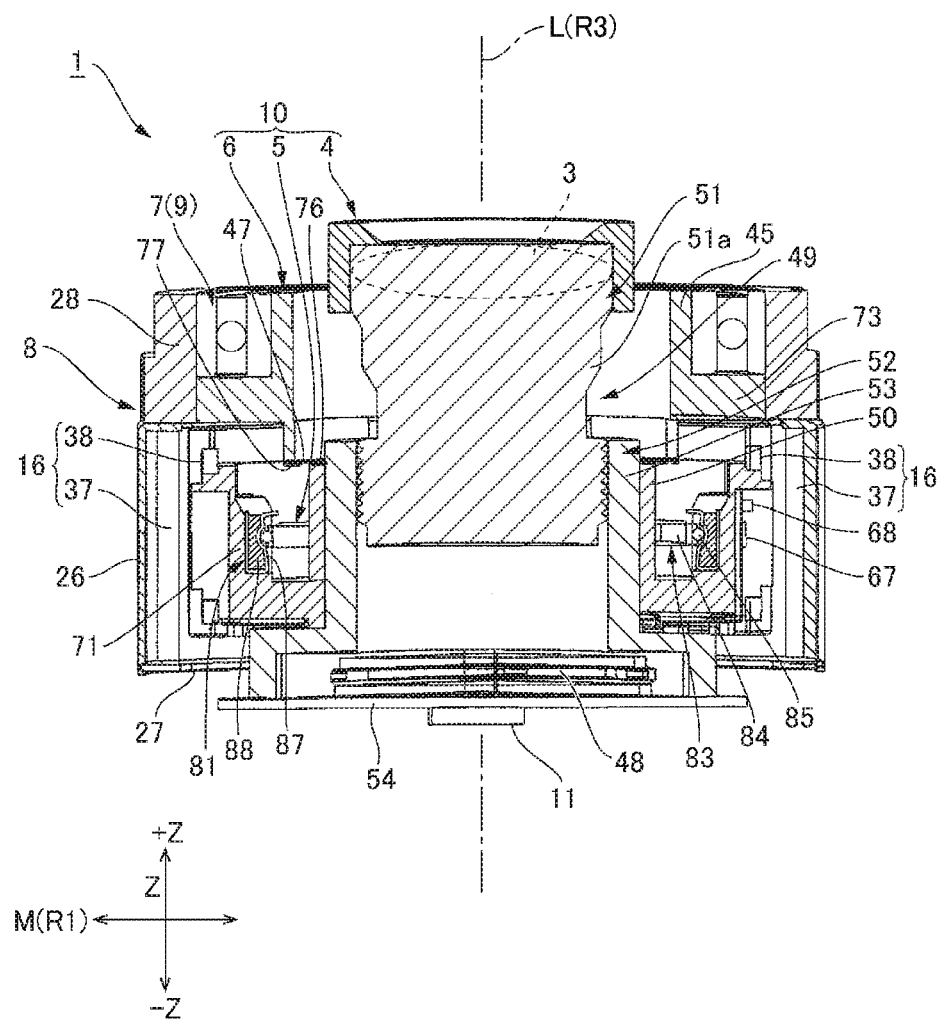
FIGS. 4A and 4B are sectional views of the optical unit with a shake correction function taken along a plane that passes through a first axis in FIG. 1 in a Z axis direction.

FIG. 1A is a perspective view when the optical unit with a shake correction function 1 is viewed from the +Z direction, and FIG. 1B is a perspective view when the optical unit with a shake correction function 1 is viewed from the −Z direction. FIG. 2 is an exploded perspective view of the optical unit with a shake correction function 1 viewed from the object side. FIG. 3 is a sectional view of the optical unit with a shake correction function taken along line A-A in FIG. 1. FIG. 4 is a sectional view of the optical unit with a shake correction function cut along a plane that passes through a first axis R1 and the Z axis (a third axis R3) in FIG. 1. FIG. 5 is a sectional view of the optical unit with a shake correction function cut along a plane that passes through a second axis R2 and the Z axis (the third axis R3) in FIG. 1. The optical unit with a shake correction function 1 is used, for example, in optical equipment such as a camera-equipped mobile phone or a drive recorder or the like, and optical equipment such as an action camera or a wearable camera mounted to a helmet, a bicycle, or a radio-controlled helicopter or the like. In such optical equipment, if shake occurs at the time of shooting, the optical unit with a shake correction function 1 is driven to correct the shake in order to avoid the captured image being blurry.

As illustrated in FIG. 1 to FIG. 3, the optical unit with a shake correction function 1 includes an optical module 4 that retains an optical element 3, a gimbal mechanism 5 (a swing support mechanism) that swingably supports the optical module 4, and a holder 6 that supports the optical module 4 via the gimbal mechanism 5. The gimbal mechanism 5 swingably supports the optical module 4 between a reference posture in which the Z axis (a preset axis) and an optical axis are aligned, and an inclined posture in which the optical axis is inclined with respect to the Z axis. That is, the optical module 4 is supported so as to be able to swing around a first axis R1 that intersects the optical axis L, and is also supported so as to be able to swing around the second axis R2 that intersects the optical axis and the first axis R1, by the gimbal mechanism 5. The first axis R1 and the second axis R2 are both orthogonal to the Z axis and are also orthogonal to each other.

Also, the optical unit with a shake correction function 1 includes a rotation support mechanism 7 that rotatably supports the holder 6, and a fixed body 8 that supports the holder 6 via the rotation support mechanism 7. The rotation support mechanism 7 is a ball bearing 9 (a rotation bearing), and enables the holder 6 to rotate around the third axis R3. The third axis R3 is in the Z axis direction. Here, the optical module 4, the holder 6, and the gimbal mechanism 5 form the movable body 10 that is displaced with respect to the fixed body 8. A gyroscope 11 is mounted, as illustrated in FIG. 1B, to an end portion of the optical module 4 in the −Z direction.

Furthermore, the optical unit with a shake correction function 1 includes a swing magnetic drive mechanism 15 that swings the optical module 4 around the first axis R1 and around the second axis R2, and a rolling magnetic drive mechanism 16 that rotates the optical module 4 and the holder 6 around the third axis R3, as illustrated in FIG. 2 to FIG. 6. The swing magnetic drive mechanism 15 is formed between the optical module 4 and the fixed body 8. The swing magnetic drive mechanism 15 includes a first swing magnetic drive mechanism 21 and a second swing magnetic drive mechanism 22. The rolling magnetic drive mechanism 16 is also formed between the optical module 4 and the fixed body 8. The rolling magnetic drive mechanism 16 is positioned between the first swing magnetic drive mechanism 21 and the second swing magnetic drive mechanism 22 around the third axis R3.

(Fixed Body)

Figure 6:
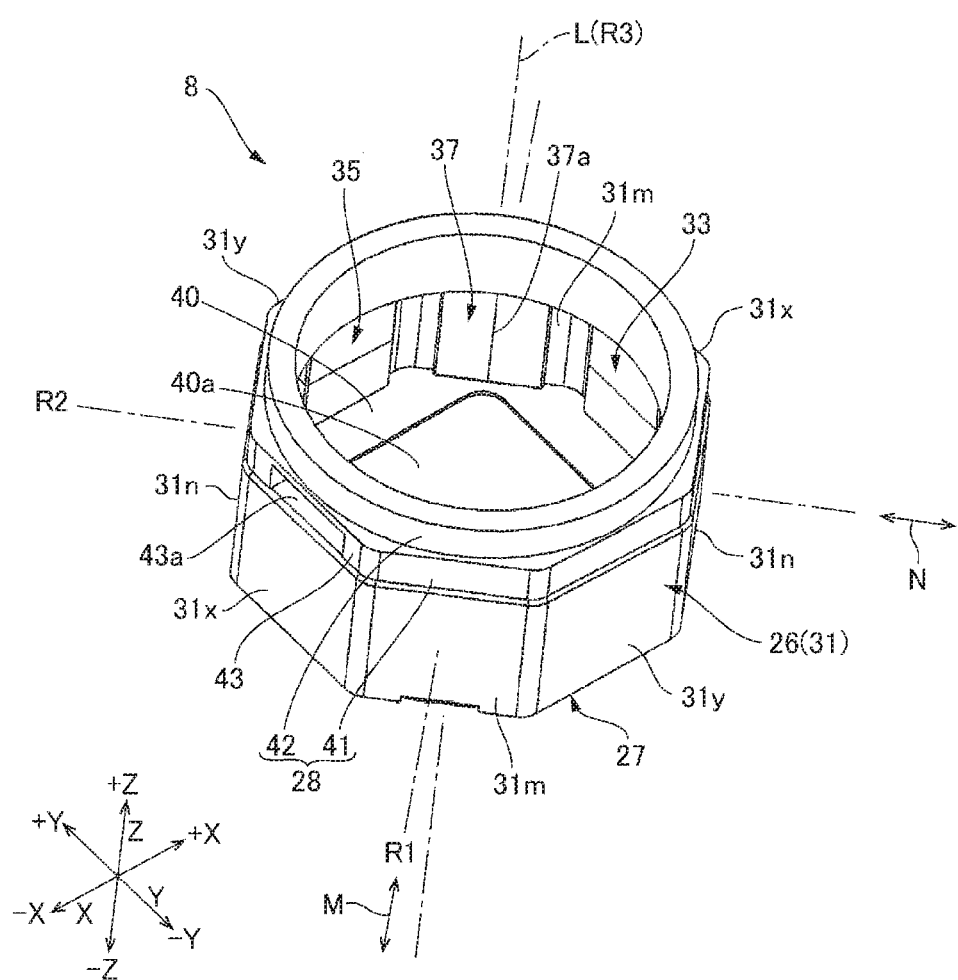
FIG. 6 is a perspective view of a fixed body.

FIG. 6 is a perspective view of the fixed body 8. The fixed body 8 includes a first case 26 that forms a generally octagonal outer shape when viewed from the Z axis direction, a second case 27 that attaches to the first case 26 from the −Z direction side, and a third case 28 that attaches to the first case 26 from the +Z direction side.

The first case 26 includes an octagonal angular tube-shaped body portion 31 that surrounds the movable body 10. The body portion 31 has two side plate portions 31x that face each other in the X direction, and two side plate portions 31y that face each other in the Y direction. Also, the body portion 31 has two side wall portions 31m that face each other in a first intermediate direction M (a direction along the first axis R1) between the +X direction and the +Y direction, and two side wall portions 31n that face each other in a second intermediate direction N (a direction along the second axis R2) between the +X direction and the −Y direction.

A first swing drive magnet 33 is fixed to a wall surface on the inner peripheral side of each of the two side plate portions 31x that face each other in the X direction, as illustrated in FIG. 3 and FIG. 6. The first swing drive magnets 33, together with first swing drive coils 34 that are mounted to the optical module 4, form the first swing magnetic drive mechanism 21. The first swing drive magnets 33 are each divided into two in the Z axis direction, and are polarized and magnetized such that magnetic poles on the inner surface side are different on one side of the division than they are on the other side of the division. A second swing drive magnet 35 is fixed to a wall surface on the inner peripheral side of each of the two side plate portions 31y that face each other in the Y direction, as illustrated in FIG. 6. The second swing drive magnets 35, together with second swing drive coils 36 that are mounted to the optical module 4, form the second swing magnetic drive mechanism 22. The second swing drive magnets 35 are each divided into two in the Z axis direction, and are polarized and magnetized such that magnetic poles on the inner surface side are different on one side of the division than they are on the other side of the division.

A third drive magnet 37 (a rolling drive magnet) is fixed to a wall surface on the inner peripheral side of each of the two side plate portions 31m that face each other in the first intermediate direction M between the +X direction and the +Y direction, as illustrated in FIG. 4 and FIG. 6. The third drive magnets 37, together with third drive coils 38 that are mounted to the optical module 4, form the rolling magnetic drive mechanism 16. The third drive magnets 37 are each divided into two in the Z axis direction, and are polarized and magnetized such that magnetic poles on the inner surface side are different on one side of the division than they are on the other side of the division. A magnetic polarization line 37a of each the third drive magnets 37 extends in the Z axis direction through the circumferential center of each of the third drive magnets 37.

The second case 27 is made of an octagonal frame-shaped plate member 40. A rectangular opening 40a is provided in the center portion of the second case 27.

The third case 28 has an octagonal angular tube portion 41 that corresponds to the outer diameter of the first case 26, and an annular portion 42 that continues in the +Z direction of the angular tube portion 41. A rectangular opening 43a is provided in one side wall portion 43 of the eight side wall portions that form the angular tube portion 41. A protrusion 44 (a rotation angle restricting portion) provided on the holder 6 is inserted into the opening 43a from the inner peripheral side, as illustrated in FIG. 1.

Also, the ball bearing 9 is inserted on the inner peripheral side of the annular portion 42, as illustrated in FIG. 1 and FIG. 3. An outer race 9a of the ball bearing 9 is fixed to the inner peripheral side of the annular portion 42. Here, a cylindrical portion 45 provided on an end portion in the +Z direction of the holder 6 is inserted on the inner peripheral side of the ball bearing 9. Also, an inner race 9b of the ball bearing 9 is fixed to an outer peripheral side of the cylindrical portion 45 of the holder 6. As a result, the fixed body 8 rotatably retains the holder 6. Note that a lens tube 51 of the optical module 4 is inserted on the inner peripheral side of the cylindrical portion 45 of the holder 6. Therefore, the optical module 4 is inserted on the inner peripheral side of the ball bearing 9. A portion of the lens tube 51 overlaps with the ball bearing 9 when viewed from a direction orthogonal to the Z direction.

(Movable Body)

Figure 7:
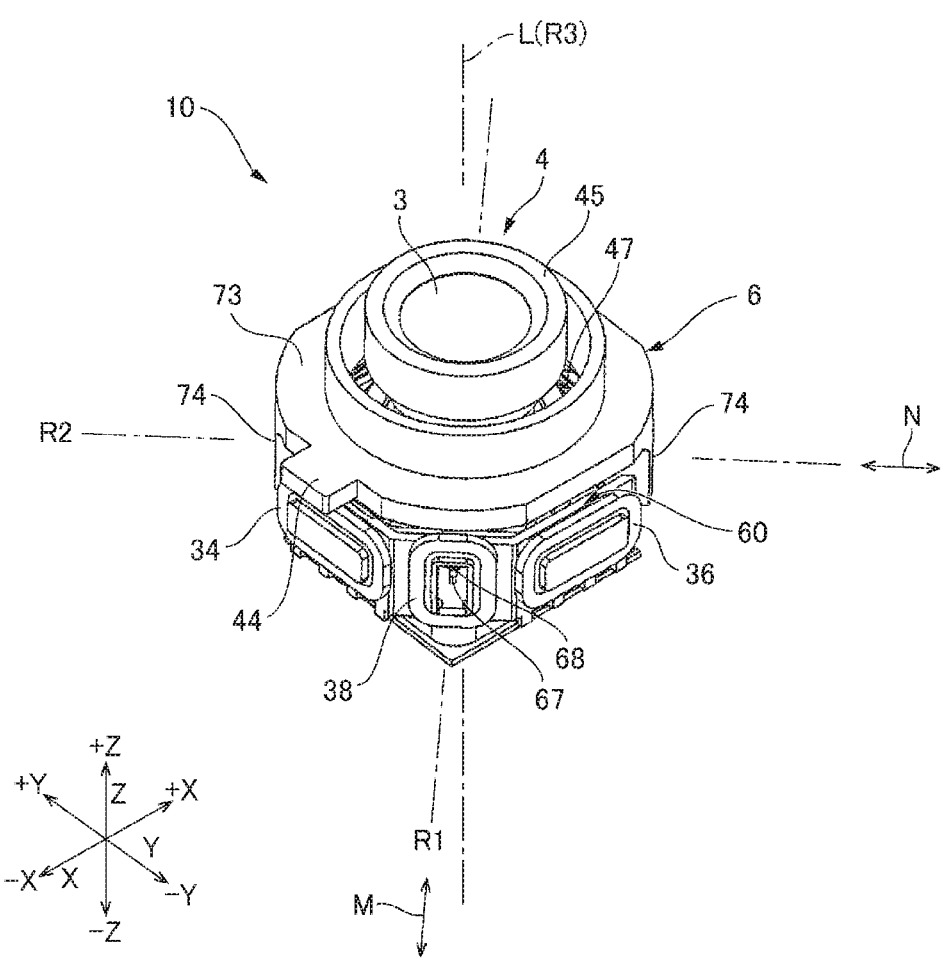
FIG. 7 is a perspective view of a movable body.

FIG. 7 is a perspective view of the movable body 10. The movable body 10 includes the optical module 4, the holder 6, and the gimbal mechanism 5, as illustrated in FIG. 2 and FIG. 7. The movable body 10 also includes a spring member 47 that extends between the optical module 4 and the holder 6.

(Optical Module)

Figure 8:
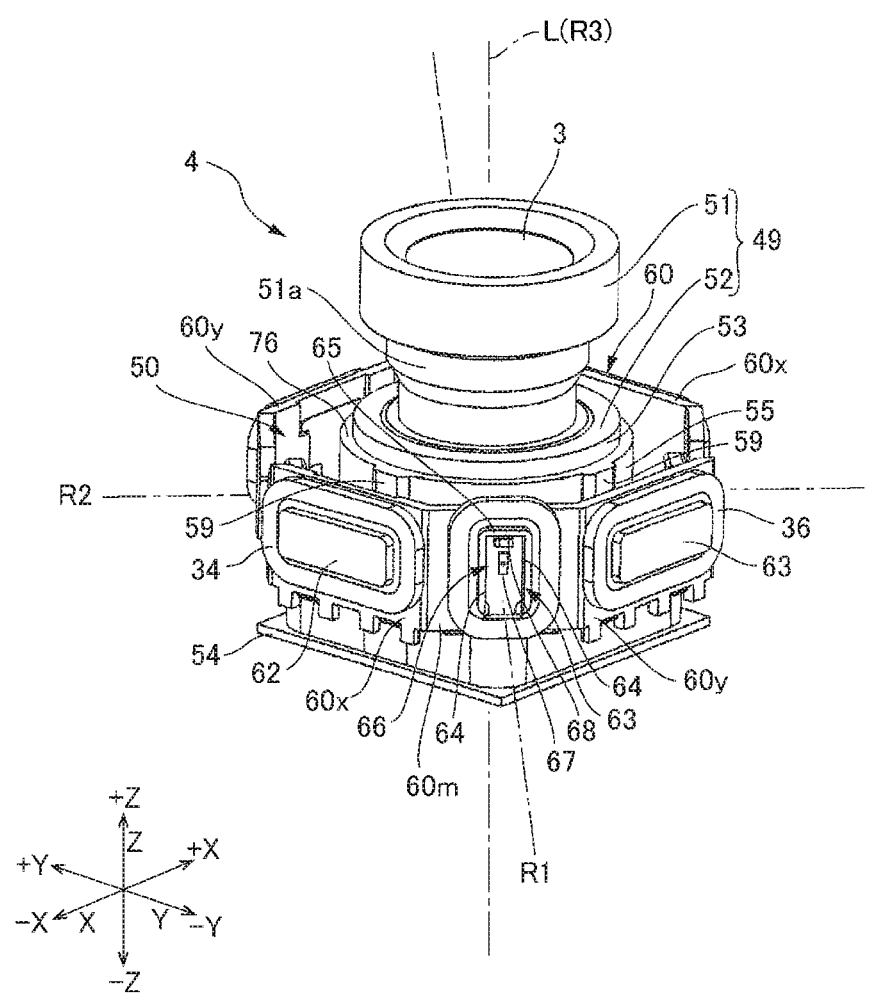
FIG. 8 is a perspective view of an optical module.
Figure 9:
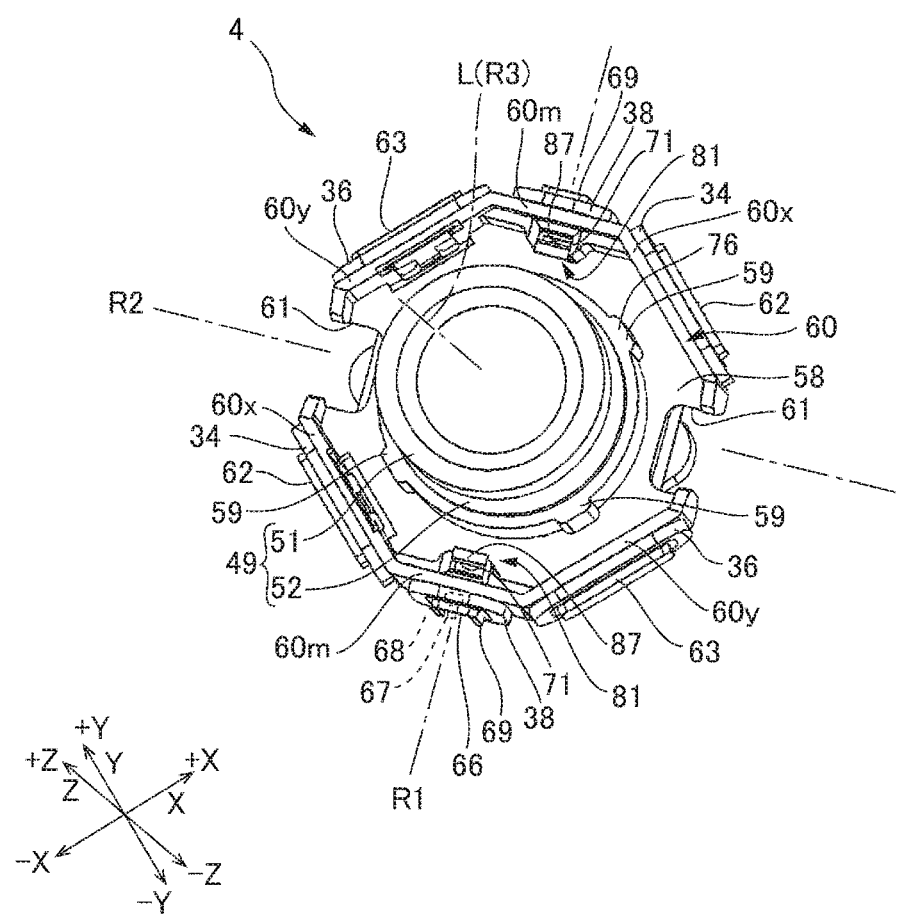
FIG. 9 is a perspective view of the optical module.

FIG. 8 and FIG. 9 are perspective views of the optical module 4. The rectangular plate portion is not illustrated in FIG. 9. The optical module 4 includes a module body portion 49 that includes the optical element 3 and an imaging element 48, and a lens tube holder 50 that retains the module body portion 49 from the outer peripheral side, as illustrated in FIG. 8.

The module body portion 49 includes the lens tube 51, and a lens tube support member 52 that retains an end portion in the −Z direction of the lens tube 51. The lens tube 51 retains a plurality of optical elements 3 such as lenses on the inner peripheral side. In this example, at least one optical element 3, from among the plurality of optical elements 3, is made of glass and the other optical element(s) 3 is/are made of plastic. Note that all of the plurality of optical elements 3 may be made of plastic. The lens tube support member 52 includes a cylindrical portion 53, and a rectangular plate portion 54 that closes off an end portion in the −Z direction of the cylindrical portion 53, as illustrated in FIG. 8. The end portion in the −Z direction of the lens tube 51 is inserted into the cylindrical portion 53 from the +Z direction. The imaging element 48 is fixed to the end surface on the side in the +Z direction of the rectangular plate portion 54 and is positioned inside the cylindrical portion 53, as illustrated in FIG. 3, FIG. 4, and FIG. 5. The gyroscope 11 is fixed to the center portion of the end surface on the side in the −Z direction of the rectangular plate portion 54. The imaging element 48 and the gyroscope 11 are positioned overlapping with the optical axis of the optical elements 3 retained in the optical module 4. A protruding portion 51a of the lens tube 51 that protrudes out in the +Z direction from the lens tube support member 52 is positioned to the inner peripheral side of the ball bearing 9, and overlaps with the ball bearing 9 when viewed from a direction orthogonal to the Z axis.

The lens tube holder 50 includes a retaining tube 55 that extends in the Z axis direction, and a generally octagonal plate portion 58 that extends toward the outer peripheral side from the end in the −Z direction of the retaining tube 55, as illustrated in FIG. 8 and FIG. 9. The module body portion 49 (the lens tube support member 52) is retained by the retaining tube 55 by being press fit into the retaining tube 55 from the −Z axis direction. The retaining tube 55 has four protruding portions 59 that protrude in the +X direction, the −X direction, the +Y direction, and the −Y direction, respectively, on the outer peripheral surface. The end surface in the +Z direction of the retaining tube 55 and the end surface in the +Z direction of each of the protruding portions 59 are continuous with no steps. The end surface in the +Z direction of the retaining tube 55 and the end surface in the +Z direction of each of the protruding portions 59 form an optical module side spring member fixing portion 76 that fixes the spring member 47. The spring member 47 is fixed to the optical module side spring member fixing portion 76 via an adhesive layer formed on the optical module side spring member fixing portion 76. Therefore, in a state in which the spring member 47 is fixed, the spring member 47 is suspended in the +Z direction from the optical module side spring member fixing portion 76. The plate portion 58 includes six wall portions 60 that rise up in the +Z direction in six locations around the outer peripheral side of the retaining tube 55. The six wall portions 60 include two wall portions 60x that face each other in the X direction, two wall portions 60y that face each other in the Y direction, and two wall portions 60m that face each other in the first intermediate direction M. Notches 61 are provided in the plate portion 58 in a second intermediate direction N where the wall portions 60 are not provided.

The two wall portions 60x that face each other in the X direction each have, on the outer peripheral surface, a first coil retaining portion 62 that retains the first swing drive coil 34. The two wall portions 60y that face each other in the Y direction each have, on the outer peripheral surface, a second coil retaining portion 63 that retains the second swing drive coil 36. The first coil retaining portion 62 and the second coil retaining portion 63 are rectangular protruding portions that are long in the circumferential direction around the Z axis. The first swing drive coil 34 is fixed to the lens tube holder 50 in a state with the first coil retaining portion 62 inserted into a center hole of the first swing drive coil 34. The second swing drive coil 36 is fixed to the lens tube holder 50 in a state with the second coil retaining portion 63 inserted into a center hole of the second swing drive coil 36. The first coil retaining portion 62 and the second coil retaining portion 63 protrude toward the outer peripheral side from the centers of the drive coils 34 and 36, respectively, as illustrated in FIG. 3.

The two wall portions 60m that face each other in the first intermediate direction M each have, on the outer peripheral surface, a third coil retaining portion 69 that retains the third drive coil 38. The third coil retaining portion 69 has a pair of vertical ribs 64 that extend in parallel in the Z direction, and a lateral rib 65 that connects the ends in the +Z direction of the pair of vertical ribs 64 together. The third drive coil 38 is fixed to the lens tube holder 50 in a state with the pair of vertical ribs 64 and the lateral rib 65 inserted into a center hole of the third drive coil 38. Here, a portion of one wall portion 60m, of the two wall portions 60m, that is surrounded by the pair of vertical ribs 64 and the lateral rib 65 is a sensor retaining portion 66. A magnetic sensor 67 and a temperature sensor 68 are fixed to the sensor retaining portion 66. In this example, the magnetic sensor 67 is a Hall element. The temperature sensor 68 is a thermistor. The two wall portions 60m that face each other in the first intermediate direction M each have a first contact spring retaining portion 71 that forms the gimbal mechanism 5, on the inner peripheral surface, as illustrated in FIG. 9.

(Holder)

Figure 10A:
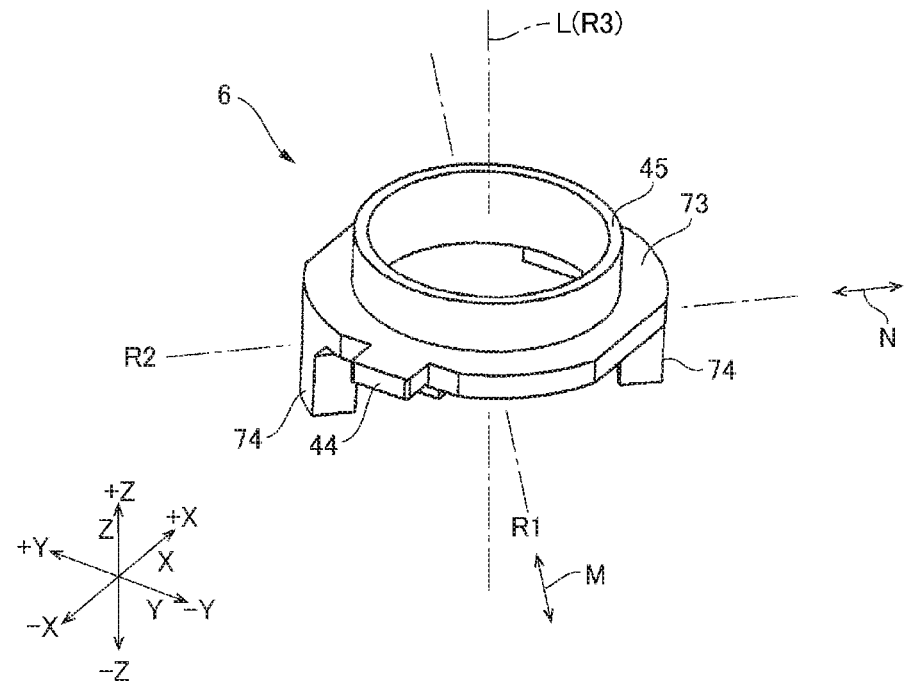
FIGS. 10A and 10B are perspective view of a holder viewed from an object side and an image side.
Figure 10B:
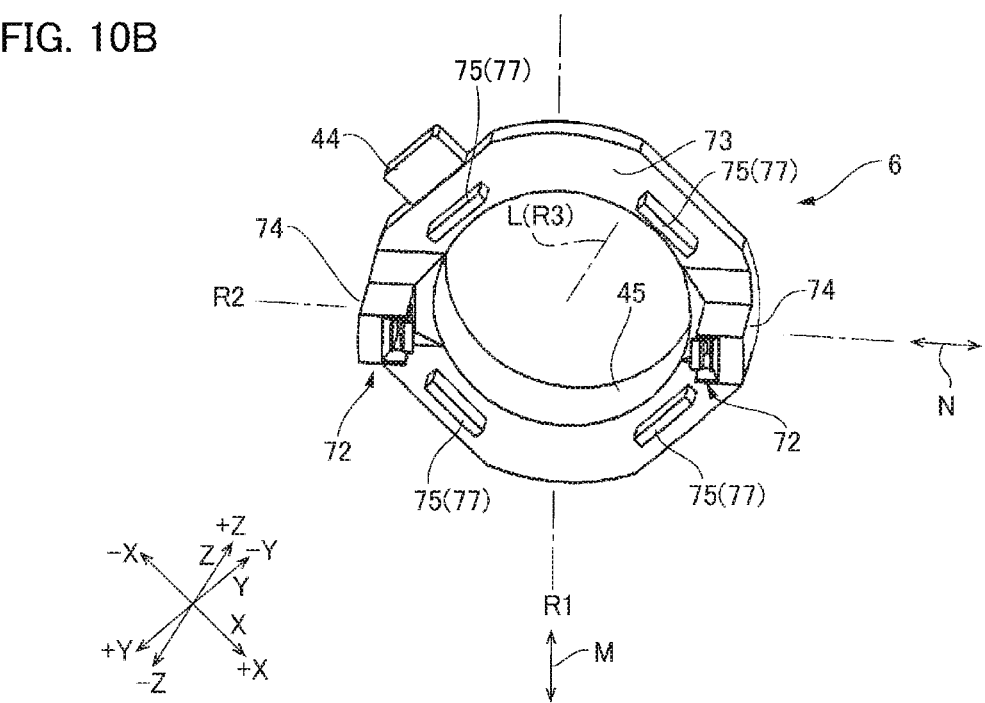

FIG. 10A is a perspective view when the holder 6 is viewed from the +Z direction, and FIG. 10B is a perspective view when the holder 6 is viewed from the −Z direction. As illustrated in FIG. 10, the holder 6 includes the cylindrical portion 45 that is inserted on the inner peripheral side of the ball bearing 9, and an annular plate portion 73 that extends toward the outer peripheral side from the end edge in the −Z direction of the cylindrical portion 45. The contour shape when the annular plate portion 73 is viewed from the Z axis direction is generally octagonal, and the protrusion 44 that protrudes toward the outer peripheral side is provided on a portion in the circumferential direction. A pair of supports 74 that extend in the −Z direction are provided on opposing portions in the second intermediate direction N sandwiching the cylindrical portion 45, on the annular plate portion 73. A second contact spring retaining portion 72 that forms the gimbal mechanism 5 is provided on an inner peripheral side portion of a tip end portion of each support 74.

Also, a rectangular protrusion 75 that protrudes in the −Z direction is provided on an end surface portion positioned on both sides in the X direction sandwiching the cylindrical portion 45, on the end surface in the −Z direction of the annular plate portion 73. A rectangular protrusion 75 that protrudes in the −Z direction is also provided on an end surface portion positioned on both sides in the Y direction sandwiching the cylindrical portion 45. The end surface in the −Z direction of each protrusion 75 is a flat surface, and is a holder side spring member fixing portion 77 for fixing the spring member 47. When the holder 6 retains the optical module 4 via the gimbal mechanism 5, the supports 74 of the holder 6 are inserted into portions of the optical module 4 where the wall portions 60 are not provided, as illustrated in FIG. 7.

(Gimbal Mechanism)

Figure 11:
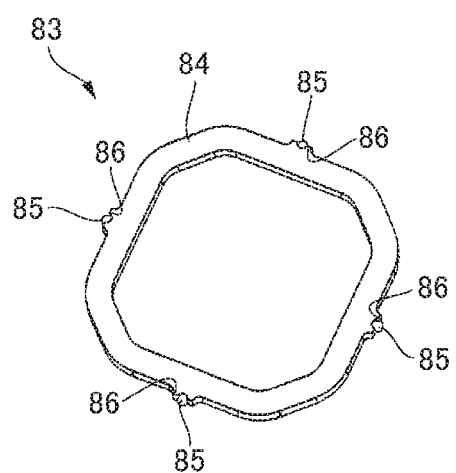
FIG. 11 is a perspective view of a movable frame.
Figure 12:
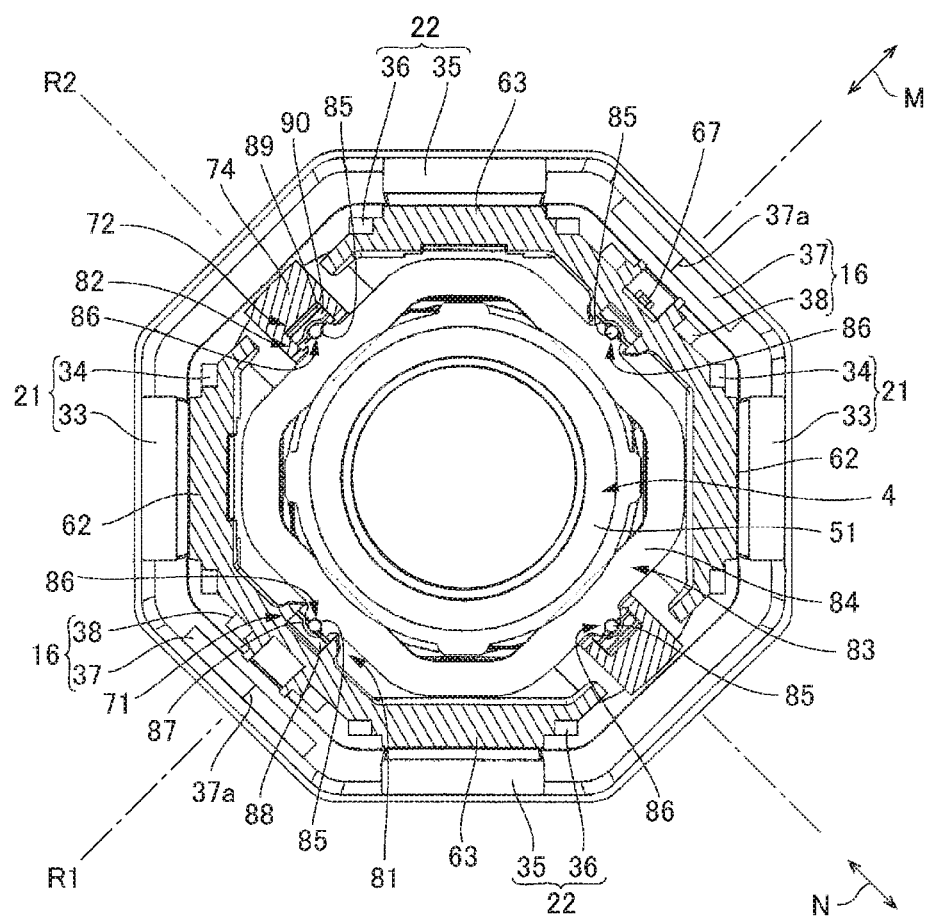
FIG. 12 is a sectional view of the optical unit with a shake correction function cut along a plane orthogonal to an axis.

The gimbal mechanism 5 will now be described with reference to FIG. 4, FIG. 5, FIG. 11, and FIG. 12. FIG. 11 is a perspective view of a movable frame 83. FIG. 12 is a sectional view of the optical unit with a shake correction function 1 cut along a plane orthogonal to the Z axis. The gimbal mechanism 5 is formed between the optical module 4 (the lens tube holder 50) and the holder 6. The gimbal mechanism 5 includes a first swing support portion 81 (optical module side support portion, see FIG. 4) arranged in two locations apart from each other in the first axis R1 direction when the optical module 4 is assembled to the holder 6, and a second swing support portion 82 (holder side support portion, see FIG. 5) arranged in two locations apart from each other in the second axis R2 direction when the optical module 4 is assembled to the holder 6. The gimbal mechanism 5 also includes the movable frame 83 (frame body) that is supported by the first swing support portion 81 and the second swing support portion 82. The first swing support portion 81 is provided on the optical module 4, and the second swing support portion 82 is provided on the holder 6.

First, the movable frame 83 includes a generally octagonal frame-shaped gimbal spring 84, as illustrated in FIG. 11. The gimbal spring 84 has a frame portion of a constant width, and support portions 86 provided one at each of four locations around the optical axis L on the frame portion. The support portions 86 protrude toward the outside from the center in the circumferential direction of each side portion of the octagon. A spherical body 85 is fixed by welding or the like to the outer peripheral surface of each of the support portions 86. A semi-spherical convex surface that faces toward the outside of the movable frame 83 is provided on each support portion 86 by these spherical bodies 85. The first swing support portion 81 and the second swing support portion 82 support the support portions 86 from the outer peripheral side. Note that the gimbal spring 84 is a laminated body in which a plurality of plate-like springs are laminated in the optical axis L direction (the Z axis direction).

Figure 4B:
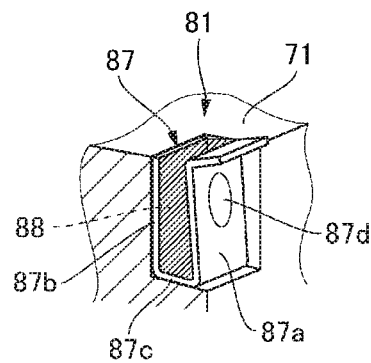
Figure 5A:
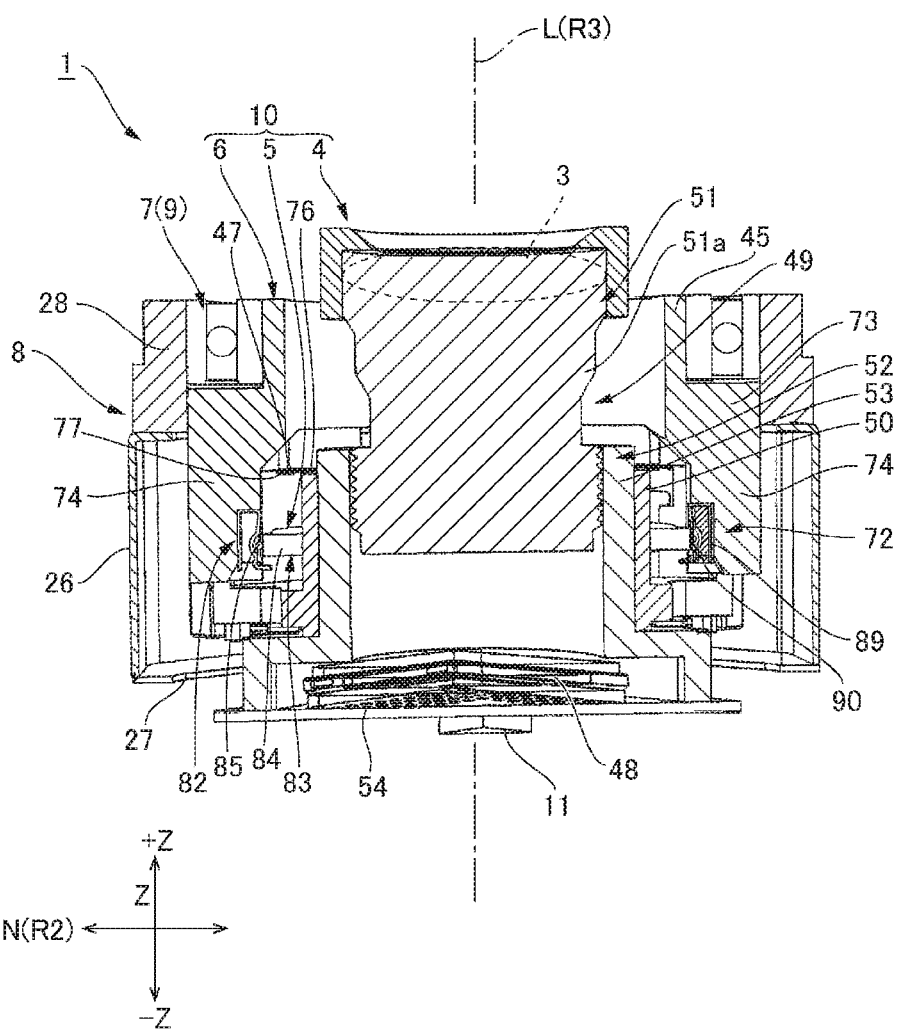
FIGS. 5A and 5B are sectional views of the optical unit with a shake correction function taken along a plane that passes through a second axis in FIG. 1 in the Z axis direction.
Figure 5B:
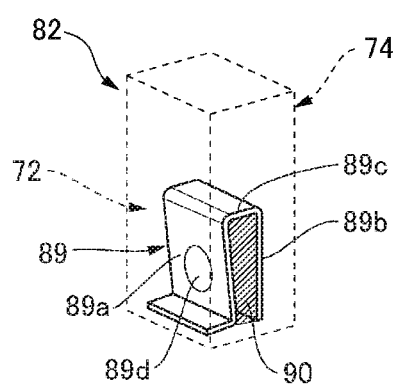

As illustrated in FIG. 4, the first swing support portion 81 includes the first contact spring retaining portion 71 provided on the lens tube holder 50 of the optical module 4, a first contact spring 87 retained by the first contact spring retaining portion 71, and an elastic adhesive 88. The first contact spring 87 is a metal plate spring that is bent in a U-shape. As illustrated in FIG. 4B, the first contact spring 87 has an inside plate spring portion 87a that extends in the Z direction, an outside plate spring portion 87b that extends in the Z direction on the outer peripheral side of the inside plate spring portion 87a, with a gap between the outside plate spring portion 87b and the inside plate spring portion 87a, and a connecting spring portion 87c that extends in the radial direction and connects the end in the −Z direction of the inside plate spring portion 87a with the end in the −Z direction of the outside plate spring portion 87b. The inside plate spring portion 87a and the outside plate spring portion 87b are oriented with the thickness direction in the radial direction. A spring side contact portion 87d formed by a semi-spherical concave portion is provided on the inside plate spring portion 87a. The spherical body 85 that is welded to the support portion 86 of the movable frame 83 contacts the spring side contact portion 87d from the inner peripheral side. As a result, the movable frame 83 is swingably supported by the optical module 4 (the first swing support portion 81). The elastic adhesive 88 is filled between the inside plate spring portion 87a and the outside plate spring portion 87b. The elastic adhesive 88 has elasticity in a cured state.

As illustrated in FIG. 5, the second swing support portion 82 includes the second contact spring retaining portion 72 provided on each support 74 of the holder 6, a second contact spring 89 retained by the second contact spring retaining portion 72, and an elastic adhesive 90. The second contact spring 89 is a metal plate spring that is bent in a U-shape, and has the same shape as the first contact spring 87. That is, the second contact spring 89 has an inside plate spring portion 89a that extends in the Z direction, an outside plate spring portion 89b that extends in the Z direction on the outer peripheral side of the inside plate spring portion 89a, with a gap between the outside plate spring portion 89b and the inside plate spring portion 89a, and a connecting spring portion 89c that extends in the radial direction and connects the end in the +Z direction of the inside plate spring portion 89a with the end in the +Z direction of the outside plate spring portion 89b. The inside plate spring portion 89a and the outside plate spring portion 89b are oriented with the thickness direction in the radial direction. A spring side contact portion 89d formed by a semi-spherical concave portion is provided on the inside plate spring portion 89a. The spherical body 85 that is welded to the support portion 86 of the movable frame 83 contacts the spring side contact portion 89d from the inner peripheral side. As a result, the movable frame 83 is swingably supported by the holder 6 (the second swing support portion 82). The elastic adhesive 90 is filled between the inside plate spring portion 89a and the outside plate spring portion 89b. The elastic adhesive 90 has elasticity in a cured state.

In a state in which the optical module 4 is retained by the holder 6 via the gimbal mechanism 5, the optical module 4 is swingably supported around two axes, i.e., the first axis R1 that passes through the pair of support portions 86 of the movable frame 83 that are supported by the first swing support portion 81 of the optical module 4, and the second axis R2 that passes through the pair of support portions 86 of the movable frame 83 that are supported by the second swing support portion 82 of the holder 6, as illustrated in FIG. 12.

(Spring Member)

The spring member 47 connects the optical module 4 and the holder 6 by bridging between the optical module side spring member fixing portion 76 of the optical module 4, and the holder side spring member fixing portion 77 (the protrusions 75 of the annular plate portion 73) of the holder 6, as illustrated in FIG. 3, FIG. 4, and FIG. 5. The reference posture of the optical module 4 when stationary is determined by the spring member 47. In the reference posture, the optical axis of the optical module 4 and the Z axis are aligned.

The spring member 47 is a rectangular frame-shaped plate spring of processed metal sheet, as illustrated in FIG. 2. The spring member 47 has four holder side connecting portions 91 provided on the outer peripheral portion. The spring member 47 is connected to the holder 6 by the holder side connecting portions 91 being fixed to the holder side spring member fixing portion 77 (the protrusions 75 of the annular plate portion 73). Also, the spring member 47 has a circular frame-shaped optical module side connecting portion 92 on the inner peripheral portion. The spring member 47 is connected to the optical module 4 by the optical module side connecting portion 92 being fixed via an adhesive layer to the optical module side spring member fixing portion 76. The holder side connecting portions 91 are connected to the optical module side connecting portion 92 by arms 93. The arms 93 are bent between the optical module side spring member fixing portion 76 and the holder side connecting portions 91.

(Swing Magnetic Drive Mechanism)

Here, in a state in which the holder 6 retaining the optical module 4 is retained in the fixed body 8 via the ball bearing 9, the first swing drive coils 34 and the first swing drive magnets 33, respectively, face each other on the +X direction side and the -X direction side of the lens tube 51 of the optical module 4, and form the first swing magnetic drive mechanism 21, as illustrated in FIG. 3 and FIG. 12. Also, in a state in which the holder 6 retaining the optical module 4 is retained in the fixed body 8 via the ball bearing 9, the second swing drive coils 36 and the second swing drive magnets 35, respectively, face each other on the +Y direction side and the -Y direction side of the lens tube 51 of the optical module 4, and form the second swing magnetic drive mechanism 22, as illustrated in FIG. 12.

The swing magnetic drive mechanism 15 swings the optical module 4 around the first axis R1 and around the second axis R2 by the combined force of the magnetic driving force generated by energizing the first swing magnetic drive mechanism 21, and the magnetic driving force generated by energizing the second swing magnetic drive mechanism 22. Energization of the first swing drive coils 34 and the second swing drive coils 36 is controlled on the basis of a shake detection result from the gyroscope 11. That is, drive current that drives the optical module in a direction that cancels out the shake detected by the gyroscope 11 is supplied to the first swing drive coils 34 and the second swing drive coils 36. As a result, the optical module 4 swings in the opposite direction from the shake around the first axis R1, and swings in the opposite direction from the shake around the second axis R2, such that shake in both the pitching direction and the yawing direction is corrected.

Here, energization of the first swing drive coils 34 and the second swing drive coils 36 is controlled on the basis of a shake detection result from the gyroscope 11. That is, drive current that drives the optical module in a direction that cancels out the shake detected by the gyroscope 11 is supplied to the first swing drive coils 34 and the second swing drive coils 36. As a result, the optical module 4 swings in the opposite direction from the shake around the first axis R1, and swings in the opposite direction from the shake around the second axis R2, such that shake in both the pitching direction and the yawing direction is corrected.

Note that the first coil retaining portion 62 and the second coil retaining portion 63 protrude toward the outer peripheral side from the center of drive coils 34 and 36, respectively. Therefore, when the movable body 10 moves in the X axis direction or the Y axis direction due to vibration or shock or the like, the first coil retaining portion 62 and the second coil retaining portion 63 abut against the opposing magnets 33 and 35, thus enabling the range of movement of the optical module 4 to be restricted. As a result, deformation of the spring member 47 is able to be suppressed.

(Rolling Magnetic Drive Mechanism)

Also, in a state in which the holder 6 retaining the optical module 4 is retained in the fixed body 8 via the ball bearing 9, the third drive coils 38 and the third drive magnets 37, respectively, face each other on one side and the other side of the lens tube 51 of the optical module 4, and form the rolling magnetic drive mechanism 16, as illustrated in FIG. 4 and FIG. 12. These two sets of the third drive coils 38 and the third drive magnets 37 are connected by wire such that magnetic driving force in the same direction around the Z axis (the third axis R3) is generated at the time of energization. Therefore, shake correction of the Z axis (the third axis R3) is able to be performed by energizing the two third drive coils 38.

Energization of the third drive coils 38 is controlled to arrange the optical module 4 at a predetermined position of origin around the Z axis, on the basis of a shake detection result by the magnetic sensor 67. In this example, the position of origin of the optical module 4 is a position in which the magnetic sensor 67 mounted to the optical module 4 faces the magnetic polarization line 37a of the third drive magnet 37. The state in which the optical module 4 is arranged at the position of origin is the state illustrated in FIG. 12.

For example, when the optical module 4 shakes around the Z axis, the magnetic sensor 67 moves from the magnetic polarization line 37a to the side of one of the magnetized portions, either the N pole or the S pole. As a result, output (voltage output) from the magnetic sensor 67 changes in accordance with the amount of displacement (the shake amount) of the optical module 4. Also, the output from the magnetic sensor 67 changes to the plus side of a reference voltage in a case where the optical module 4 has shaken to one side of the position of origin (the magnetic polarization line 37a) around the Z axis, and changes to the minus side of the reference voltage in a case where the optical module 4 has shaken to the other side of the position of origin (the magnetic polarization line 37a) around the Z axis. In this way, the output from the magnetic sensor 67 changes in accordance with the shake width and the shake direction. Therefore, drive current that drives the optical module in a direction that cancels out the shake detected by the magnetic sensor 67 is supplied to the third drive coil 36 on the basis of the output from the magnetic sensor 67. As a result, the optical module 4 swings in the opposite direction from the shake around the third axis R3, so shake in the rolling direction is corrected.

Here, the optical unit with a shake correction function 1 in this example is not provided with a spring member or the like that mechanically returns the optical module 4 to the position of origin around the Z axis. Therefore, energization of the third drive coils 38 is constantly controlled on the basis of the output from the magnetic sensor 67 to arrange the optical module 4 at the position of origin.

Note that the temperature sensor 68 that is fixed, together with the magnetic sensor 67, to the sensor retaining portion 66 is used to correct the output from the magnetic sensor 67. That is, the characteristics of the magnetic sensor 67 such as a Hall element fluctuate with heat. Also, the temperature of the space surrounded by the third drive coils 36 changes due to the heat generated by the third drive coils 38 when the third drive coils 36 are energized. Therefore, a decrease in the accuracy of shake correction in the rolling direction caused by a change in temperature can be suppressed by correcting the output from the magnetic sensor 67 on the basis of the output (temperature) from the temperature sensor 68.

Also, the magnetic sensor 67 is in a position overlapping with the movable frame 83 when the optical module 4 in the reference posture is viewed from a direction orthogonal to the Z axis. As a result, even if the optical module 4 swings, the displacement of the magnetic sensor 67 around the first axis R1 and around the second axis R2 can be reduced, so the output from the magnetic sensor 67 can be prevented from greatly fluctuating due to swing of the optical module 4. Also, when the optical module 4 swings from the reference posture to one side and the other side around the first axis R1 and the second axis R2, the amount of displacement of the magnetic sensor 67 when the optical module 4 swings to one side can be balanced out with the amount of displacement of the magnetic sensor 67 when the optical module 4 swings to the other side. As a result, it is possible to balance the outputs from the magnetic sensor 67 when the optical module 4 swings. Therefore, the position of origin of the holder in the Z axis direction can be accurately detected. Also, the magnetic sensor 67 faces the center of the third drive magnet 37 in the Z direction, so the magnetic sensor 67 is able to be arranged in a position where the magnetic flux is relatively strong. Accordingly, the output from the magnetic sensor 67 can be ensured.

Here, in this example, the protrusion 44 of the holder 6 is inserted into the opening 43a of the third case 28 of the fixed body 8 when retaining the holder 6 retaining the optical module 4 in the fixed body 8 via the ball bearing 9. Accordingly, the protrusion 44 and the opening 43a of the third case 28 form a rotation angle restricting mechanism that restricts the rotation angle range around the Z axis of the holder 6 (the optical module 4). That is, when the holder 6 rotates excessively around the Z axis, the inner peripheral wall surface of the opening 43a in the third case 28 abuts against the protrusion 44 from the circumferential direction around the Z axis, thereby restricting this rotation.

Note that the position of origin around the Z axis of the optical module 4 does not have to be a position where the magnetic sensor 67 faces the magnetic polarization line 37a. For example, the position of origin can be a position where the magnetic sensor 67 is arranged in the center of the rotation angle range of the holder 6 (the optical module 4) that is defined by the rotation angle restricting mechanism described above. When making the position of origin such a position, the holder 6 (the optical module 4) is rotated within the rotation angle range while monitoring the output of the magnetic sensor 67, and the output from the magnetic sensor 67 at the center of the rotation angle range is stored in memory, in advance. Then, the position at which the output from the magnetic sensor 67 matches the value stored in memory is made the position of origin.

(Operation and Effects)

As described above, the optical unit with a shake correction function 1 in this example is such that the ball bearing 9 that rotatably supports the holder 6 is positioned on the subject side of the gimbal mechanism 5. Also, the lens tube 51 that retains the optical element 3 in the optical module 4 is inserted on the inner peripheral side of the ball bearing 9. Therefore, distance between the center of gravity of the holder 6 and the ball bearing 9 is close, even if the center of gravity of the holder 6 that supports the optical module 4 is offset to the subject side in a case where the optical module 4 has a large aperture lens or a glass lens as the optical element 3, or the like. As a result, when external force is applied, stress generated in the ball bearing 9 can be suppressed, so damage to the ball bearing 9 and damage to the portions of the movable body 10 and the fixed body 8 that are supported by the ball bearing 9 can be prevented or suppressed. Also, the lens tube 51 that retains the optical element 3 in the optical module 4 is inserted on the inner peripheral side of the ball bearing 9. Therefore, the lens tube 51 is able to be protected from the outer peripheral side by the ball bearing 9.

Also, in this example, the rolling magnetic drive mechanism 16 is able to be arranged in the empty space between the first swing magnetic drive mechanism 21 and the second swing magnetic drive mechanism 22 around the Z axis. As a result, the first swing magnetic drive mechanism 21, the second swing magnetic drive mechanism 22, and the rolling magnetic drive mechanism 16 can be arranged in the same position in the Z axis direction, thus making it easy to shorten the device in the Z axis direction.

Furthermore, in this example, the first swing support portion 81 and the second swing support portion 82 that support the movable frame 83 in the gimbal mechanism 5 are provided in the empty space between the first swing magnetic drive mechanism 21 and the second swing magnetic drive mechanism 22 around the Z axis. Providing the first swing support portion 81 and the second swing support portion 82 in such a position makes it possible to inhibit the device from becoming larger.

Also, in this example, the first swing drive coils 34, the second swing drive coils 36, and the third drive coils 38 are all arranged on the optical module 4. Consequently, it is easier to integrate a power supplying flexible printed circuit board for supplying power to the drive coils 34, 36, and 38, and the like.

Here, the first swing drive coils 34, the second swing drive coils 36, and the third drive coils 38 can be configured on the flexible printed circuit board, and fixed as one piece to the optical module 4.

Also, in this example, the ball bearing 9 is used as the rotation support mechanism 7 that rotatably supports the holder 6, but a rotation bearing such as a slide bearing can also be used as the rotation support mechanism 7. An oil-impregnated bearing or the like can be used as the slide bearing.

Furthermore, in this example, the drive magnets 33, 35, and 37 that form the swing magnetic drive mechanism 15 and the rolling magnetic drive mechanism 16 are fixed to the fixed body 8, and the drive coils 34, 36, and 38 are fixed to the optical module 4, but as long as the drive coils 34, 36, and 38 corresponding to the drive magnets 33, 35, and 37 are arranged facing one another, respectively, their arrangement is not limited to the example described above. For example, the drive magnets 33, 35, and 37 may be fixed to the optical module 4, and the drive coils 34, 36, and 38 may be fixed to the fixed body 8. In this case, the magnetic sensor 67 can be fixed to the same member as the third drive coils 38, and face the third drive magnets 37.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, the optical unit comprising:
    an optical module comprising an optical element;
    a swing support mechanism structured to swingably support the optical module between a reference posture in which a preset axis and an optical axis are aligned, and an inclined posture in which the optical axis is inclined with respect to the axis;
    a holder structured to support the optical module via the swing support mechanism;
    a rotation support mechanism structured to rotatably support the holder around the axis;
    a fixed body structured to support the holder via the rotation support mechanism;
    a swing magnetic drive mechanism structured to swing the optical module; and
    a rolling magnetic drive mechanism structured to rotate the holder,
    wherein the rotation support mechanism comprises a rotation bearing that supports the holder on a subject side of the swing support mechanism,
    the rolling magnetic drive mechanism comprises a rolling drive magnet arranged on one of the optical module and the fixed body, and a rolling drive coil arranged on the other so as to face the rolling drive magnet,
    the swing magnetic drive mechanism comprises a first swing magnetic drive mechanism and a second swing magnetic drive mechanism for swinging the optical module,
    when two directions that are orthogonal to the axis and intersect each other are a first direction and a second direction, the swing support mechanism is structured to swingably support the optical module around a first axis along the first direction and around a second axis along the second direction,
    the rolling drive magnet and the rolling drive coil face each other in at least one of the first direction and the second direction, and
    the rolling magnetic drive mechanism is arranged between the first swing magnetic drive mechanism and the second swing magnetic drive mechanism around the axis.

2. The optical unit with a shake correction function according to claim 1, wherein
    the first swing magnetic drive mechanism comprises a first swing drive coil fixed to the optical module, and a first swing drive magnet fixed to the fixed body,
    the second swing magnetic drive mechanism comprises a second swing drive coil fixed to the optical module, and a second swing drive magnet fixed to the fixed body,
    the rolling drive coil is fixed to the optical module,
    the rolling drive magnet is fixed to the fixed body, and
    the first swing drive coil, the second swing drive coil, and the rolling drive coil are arranged in the circumferential direction around the optical axis.

3. The optical unit with a shake correction function according to claim 2, wherein
    the optical module comprises a lens tube for retaining the optical element,
    the swing support mechanism comprises a frame that surrounds the lens tube around the axis, an optical module side support portion structured to swingably support the frame on the optical module side, and a holder side support portion structured to swingably support the frame on the holder side, and
    the optical module side support portion and the holder side support portion are positioned between the first swing magnetic drive mechanism and the second swing magnetic drive mechanism around the axis.

4. The optical unit with a shake correction function according to claim 3, wherein
    the lens tube is inserted on an inner peripheral side of the rotation bearing.

5. The optical unit with a shake correction function according to claim 4, wherein
    the rolling magnetic drive mechanism comprises a magnetic sensor mounted to one of the optical module and the fixed body, whichever the rolling drive coil is fixed to,
    the rolling drive magnet is polarized and magnetized in the circumferential direction around the axis, and
    the magnetic sensor faces a magnetic polarization line of the rolling drive magnet when the optical module is arranged at a preset position of origin around the axis.

6. The optical unit with a shake correction function according to claim 5, wherein
    the magnetic sensor is in a position overlapping with the frame when the optical module in the reference posture is viewed from a direction orthogonal to the axis.

7. The optical unit with a shake correction function according to claim 1, further comprising:
a rotation angle restricting mechanism that defines a rotation angle range of the holder,
wherein the rotation angle restricting mechanism comprises a protruding portion that protrudes in a direction intersecting the optical axis, from one to the other of the holder and the fixed body, and a rotation angle restricting portion structured to abut against the protruding portion from the circumferential direction around the optical axis, in the other of the holder and the fixed body.

8. The optical unit with a shake correction function according to claim 1, wherein
the holder comprises a cylindrical portion into which the optical module is inserted,
the rotation bearing is a ball bearing,
an inner race of the ball bearing is fixed to the cylindrical portion of the holder, and
an outer race of the ball bearing is fixed to the fixed body.

9. The optical unit with a shake correction function according to claim 1, wherein
the optical module comprises a lens tube for retaining the optical element,
the swing support mechanism comprises a frame that surrounds the lens tube around the axis, an optical module side support portion that swingably supports the frame on the optical module side, and a holder side support portion that swingably supports the frame on the holder side, and
the optical module side support portion and the holder side support portion are positioned between the first swing magnetic drive mechanism and the second swing magnetic drive mechanism around the axis.

10. The optical unit with a shake correction function according to claim 9, wherein
the lens tube is inserted on an inner peripheral side of the rotation bearing.

11. The optical unit with a shake correction function according to claim 10, wherein
the rolling magnetic drive mechanism comprises a magnetic sensor mounted to one of the optical module and the fixed body, whichever the rolling drive coil is fixed to,
the rolling drive magnet is polarized and magnetized in the circumferential direction around the axis, and
the magnetic sensor faces a magnetic polarization line of the rolling drive magnet when the optical module is arranged at a preset position of origin around the axis.

12. The optical unit with a shake correction function according to claim 11, wherein
the magnetic sensor is in a position overlapping with the frame when the optical module in the reference posture is viewed from a direction orthogonal to the axis.

* * * * *